(12) United States Patent
Cella et al.

(10) Patent No.: US 6,887,376 B2
(45) Date of Patent: May 3, 2005

(54) MOBILE IN-TANK FILTER AND ASSEMBLY THEREFOR

(75) Inventors: Albert F. Cella, Sylvania, OH (US); Donald J. Gembolis, Toledo, OH (US); Daniel W. Miller, Luckey, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 52 days.

(21) Appl. No.: 10/392,106

(22) Filed: Mar. 17, 2003

(65) Prior Publication Data

US 2003/0222006 A1 Dec. 4, 2003

Related U.S. Application Data

(60) Provisional application No. 60/365,403, filed on Mar. 18, 2002.

(51) Int. Cl.$^7$ .............................. B01D 35/02; B01D 36/00
(52) U.S. Cl. ..................... 210/188; 210/416.1; 210/436; 210/472
(58) Field of Search ............................. 210/188, 416.1, 210/416.4, 416.5, 436, 472

(56) References Cited

U.S. PATENT DOCUMENTS

| | | | |
|---|---|---|---|
| 2,925,878 A | | 2/1960 | Spann |
| 3,254,769 A | * | 6/1966 | McArthur .................... 210/194 |
| 3,476,249 A | | 11/1969 | Gray et al. |
| 4,469,594 A | | 9/1984 | Poetter |
| 4,572,724 A | * | 2/1986 | Rosenberg et al. ............... 96/6 |
| 4,675,110 A | * | 6/1987 | Fay ............................. 210/436 |
| 4,815,493 A | | 3/1989 | Miller et al. |
| 4,865,632 A | | 9/1989 | Yano et al. |
| 4,878,924 A | | 11/1989 | Yano et al. |
| 5,084,170 A | * | 1/1992 | Janik et al. .................. 210/232 |
| 5,130,014 A | | 7/1992 | Volz |
| 5,660,726 A | | 8/1997 | Dluzik |
| 5,762,796 A | | 6/1998 | Zraik |
| 5,772,868 A | | 6/1998 | Reinhardt |
| 5,951,862 A | * | 9/1999 | Bradford ..................... 210/305 |
| 6,113,781 A | | 9/2000 | Popoff et al. |
| 2003/0111403 A1 | * | 6/2003 | Zia ............................ 210/436 |

FOREIGN PATENT DOCUMENTS

| | | |
|---|---|---|
| EP | 0 631 044 | 12/1994 |
| EP | 0 773 053 | 5/1997 |
| EP | 0 892 176 | 1/1999 |

OTHER PUBLICATIONS

U.S. Appl. No. 60/334,256.*
Partial translation of WO/92/18397 beginning on p. 7, last paragraph and ending after the first partial paragraph on p. 9.
Copy of Notification of the International Search Report or the Declaration from corresponding International Application No. PCT/US03/08374.

* cited by examiner

Primary Examiner—Fred G. Prince
(74) Attorney, Agent, or Firm—Christopher H. Hunter (57) ABSTRACT

A hydraulic system includes a storage tank, a cover assembly and a filter assembly for filtering hydraulic fluid, gasses and air. The tank includes an opening and an attachment ring bounding the opening. The cover assembly has an inlet port and is removably connected to the attachment ring to support and enclose the filter assembly in the tank. The filter assembly includes a filter element having a filter media ring for filtering hydraulic fluid, and an annular breather filter surrounding the filter media ring at one end of the ring for filtering vent gas and air. The filter element is supported in a diffuser tube received in the tank opening. The diffuser tube includes a stand-off ring with a convoluted groove or channel to provide a vent path between the diffuser tube and the tank opening to direct vent gasses and ambient air through or around the breather filter.

25 Claims, 7 Drawing Sheets

MOBILE IN-TANK FILTER AND ASSEMBLY THEREFOR

CROSS-REFERENCE TO RELATED CASES

The present application claims the benefit of the filing date of U.S. Provisional Application Ser. No. 60/365,403; filed Mar. 18, 2002, the disclosure of which is expressly incorporated herein by reference.

FIELD OF THE INVENTION

The present invention relates generally to filters and filter assemblies, and more particularly to filters and assemblies for hydraulic fluids, vapors and gasses.

BACKGROUND OF THE INVENTION

Certain hydraulic systems, such as found in mobile fluid power applications, include a tank or reservoir which receives and stores excess hydraulic fluid. Most of these systems require the hydraulic fluid to be filtered at some point before the fluid reaches the critical components, such as the power cylinders. Typically a filter is installed on a filter head plumbed into the hydraulic tubing or hose, and mounted in the engine compartment or other appropriate structural location. The filter can be located in a filter housing, which itself is removably attached to the filter head; or can be provided as a spin-on unit for easy access and removal.

One known issue with these types of hydraulic systems is that pressures and vacuums are created within the tank during use. In fork lift truck applications, for example, this occurs when the fork as are being raised and lowered and fluid rushes into and is drained from the tank, or when the fork lift truck is operated on uneven surfaces. Breather vents are typically provided in the tank to ensure the proper pressures are maintained for efficient and safe operation of the hydraulic system.

As can be appreciated, such vents are subject to degradation and wear over time. A blocked or inoperable vent can prevent the proper escape or introduction of gasses and air into a tank during operation. In addition, vented gasses can include oil vapor—which raises environmental and cleanliness issues if allowed to escape freely. Likewise, ambient air entering the tank through a vent can include particles which can mix with and contaminate the hydraulic fluid. One solution is to include a filter for the vent. This solves the environmental issues, but increases the repair and maintenance effort required for the hydraulic system, and requires additional stock keeping units apart from the hydraulic fluid filters. Another issue pervasive with hydraulic systems is the amount of space available to mount components (such as filters and vents) on the vehicle chassis or the system frame. As equipment and systems become more compact, the available space for such components comes at a premium and it is a constant struggle to consolidate or arrange components in an efficient manner.

Thus, it is believed that the solutions in the past have not fully and satisfactorily addressed the problems associated with prior hydraulic systems, and particularly with hydraulic systems such as used in mobile fluid power applications. It is therefore believed there is a demand for a hydraulic system which prevents the escape of unfiltered vent gasses from a storage tank; has fewer separate filter components to reduce the stock-keeping units; has a filter that reduces the installation, repair and maintenance costs and efforts necessary for maintaining the system in safe and reliable operation; and efficiently utilizes the available space.

SUMMARY OF THE INVENTION

The present invention provides a hydraulic system which prevents the escape of unfiltered vent gasses from a tank; has fewer separate filter components to reduce the stock-keeping units; has a filter that reduces the installation, repair and maintenance costs and efforts necessary for maintaining the system in safe and reliable operation, and efficiently utilizes the available space. The present invention is particularly useful for mobile hydraulic systems such as for fork lift trucks, however is also believed useful for a wide variety of fluid power applications.

According to the present invention, a filter assembly is provided which includes a filter element having a filter media ring for filtering hydraulic fluid, and an integral annular breather filter surrounding the filter media ring at one end. An end cap is sealingly bonded to each end of the media ring, and the breather filter is fixed to an upper of the end caps. The filter element is received and supported within a diffuser tube, which is itself supported in an opening to the tank. The end cap holding the breather filter includes a central opening receiving a fluid pipe from a cover assembly, and fluidly separating a hydraulic flow path (directed internally through the central opening of the element, radially outward through the element and then internally of the diffuser tube into the tank); from a vent path external to the element (between the diffuser tube and the tank opening). Hydraulic fluid thereby passes out of the inlet tube, and is filtered through the media ring before collecting in the tank.

In one embodiment, a stand-off ring or other geometry surrounds the diffuser tube and includes one or more convoluted channels or grooves defining a portion of the vent path between the tube and the tank opening to allow vent gas in the tank to escape, and ambient air to enter the tank. In this embodiment, the breather filter comprises a thin, flat, annular disk-like member fixed at the end of the media ring in surface-to-surface sealing relation thereto, and preferably molded in one piece with the end cap. The breather filter projects radially outward from the end of the filter element, and is supported around its outer periphery on an attachment ring on the tank top, surrounding the tank opening.

Oil in the vent gases passing outwardly along the vent path collects (agglomerates) along the convoluted vent path of the stand-off ring and drains back to tank. The oil-free vent gases then pass through the breather filter for a final filtration. The breather filter preferably has some flexibility and is preloaded against the attachment ring, such that the breather filter functions like a check valve to maintain a slight pressure in the tank, and can bend upwardly off the attachment ring to exhaust to atmosphere. When the tank is under vacuum, the preload on the breather filter and the pressure differential maintain the breather filter against the attachment ring to prevent bypass. Ambient air passes through the breather filter and through the convoluted vent path into the tank, which thereby prevents particles and other contaminants from entering the hydraulic fluid in the tank.

In another embodiment, the breather filter comprises a slightly thicker annular ring outwardly bounding the end cap and attached to the end cap through an intermediate annular sealing gasket. In this embodiment, the stand-off ring is not used, and the breather filter acts both as a filter of air passing inwardly into the tank, and as a collector and agglomerator of oil particles in the gasses passing outwardly from the tank. The breather filter in this embodiment is likewise supported around its periphery on the attachment ring on the tank top, but is not flexible.

The diffuser tube includes an annular flange at its upper end which orients and properly seats the tube within the tank opening. The annular flange seats within the attachment ring on the tank top. The attachment ring includes outwardly-directed threads. A cover assembly, with an inlet port, includes a threaded collar which can be screwed down on the attachment ring to enclose the filter assembly in the tank. The cover assembly can be easily attached to and removed from the attachment ring to allow easy access to the filter assembly such that the filter element can be inspected and replaced when necessary. Other means (posts, etc.) can alternatively be used to removably attached the cover assembly to the tank.

Since the breather filter is an integral component of the hydraulic fluid filter, the number of separate stock keeping units is reduced. In addition, since the breather filter is replaced at the same time as the hydraulic fluid filter, it is ensured that the vent and the filter for the vent gasses and ambient air is properly maintained. Locating the filter assembly (at least partially) within the tank also conserves space on the chassis or frame. Thus, as will be described herein in more detail, the present invention thereby provides a hydraulic system which prevents the escape of unfiltered vent gasses from a storage tank; has fewer separate filter components to reduce the stock-keeping units; and has a filter which reduces the installation, repair and maintenance costs and efforts necessary for maintaining the system in safe and reliable operation; and efficiency utilizes the available space.

Further features of the present invention will become apparent to those skilled in the art upon reviewing the following specification and attached drawings.

DETAILED DESCRIPTION OF THE PREFERRED EMBODIMENT

Figure 1:
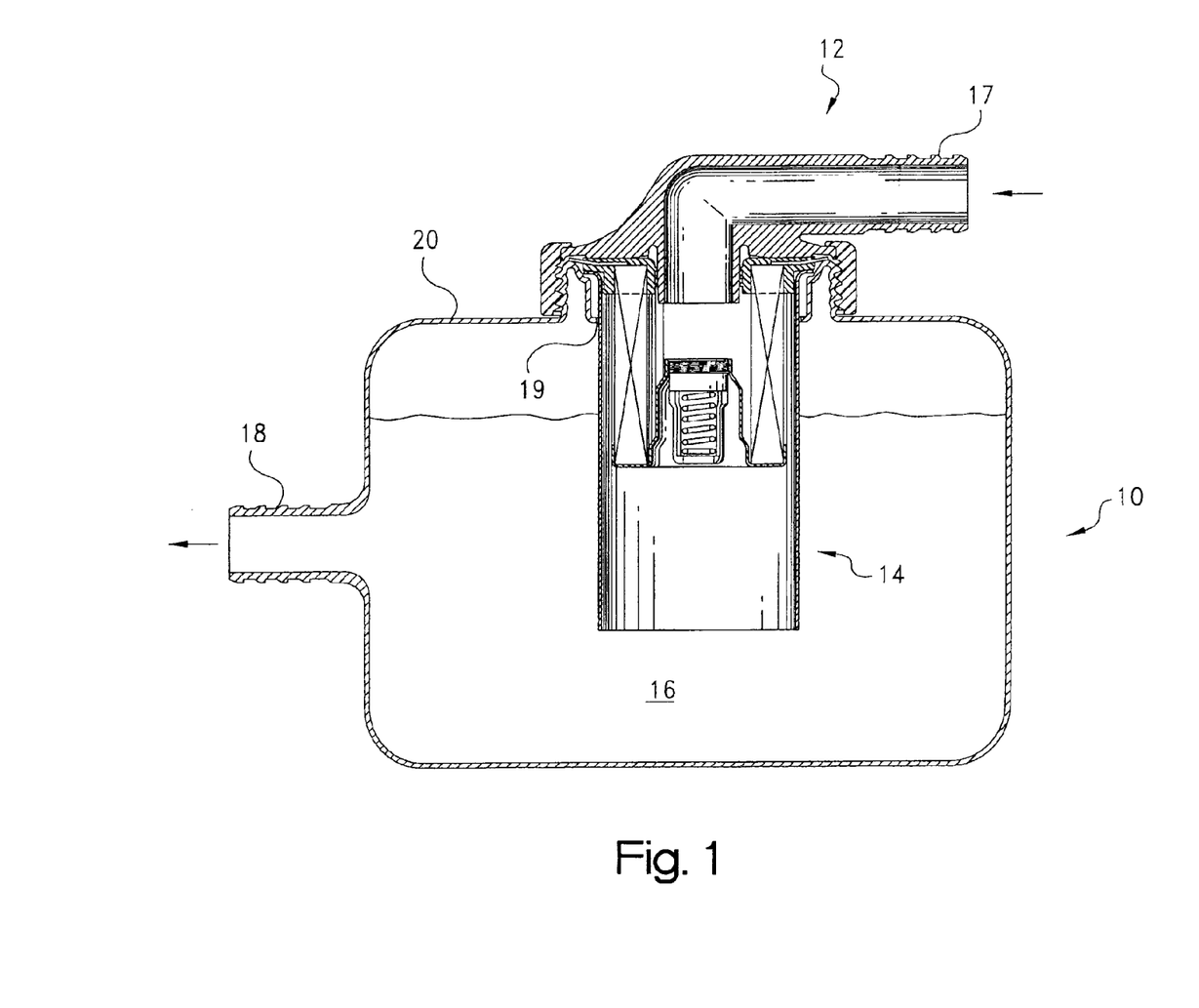
FIG. 1 is a schematic illustration of a filter assembly constructed according to the principles of the present invention, shown assembled with a fluid storage tank.

Referring to the drawings and initially to FIG. 1, a portion of a hydraulic fluid system is shown including a fluid storage tank, indicated generally at 10; a cover assembly, shown generally at 12; and a filter assembly, indicated generally at 14. The filter assembly 14 is located partially within the fluid storage tank 10, and enclosed therein by the cover assembly 12. The hydraulic system can be useful for a fork lift truck, where the tank 10 stores excess fluid 16 (e.g., hydraulic fluid) received through inlet port 17 until the fluid is drawn out through an outlet port 18 for use in the components of the system, such as in a hydraulic cylinder operating the forks. Ports 17 and 18 are preferably barbed to allow easy connection to pipes or tubing within the fluid system.

While the tank 10, cover assembly 12 and filter assembly 14 described herein are particularly useful in a hydraulic system for a fork lift truck, it should be appreciated that the present invention is likewise applicable to other fluid applications where first and second fluids (liquids, vapors, gasses, etc.) are being introduced into a container, and both fluids need to (or should) be filtered prior to entering (and/or exiting) the container.

The tank 10 comprises an enclosure having a circular opening 19 in a top wall 20. Referring now to FIGS. 2–5, the cover assembly 12 includes a circular body portion 21 and a fluid pipe 23 which directs fluid received in port 17 into the tank 10. The cover assembly 12 is removably attached to an attachment device 25 on the tank. The attachment device 25 comprises a ring integral and preferably unitary with the top wall 20 of the tank, bounding opening 19. The ring is defined by an inner cylindrical side wall 26 and an outer cylindrical side wall 27, with the sidewalls being interconnected by an annular, radially-extending end wall 28. The outer sidewall 27 has a threaded portion, as at 29; while the inner wall 26 has an axially inner distal end 30 which is curved or turned inward to define opening 19. The inner sidewall 26 and outer sidewall 27 are shown as being spaced-apart for manufacturing reasons, but it is noted that these walls could be contiguous, or unitary.

As will be described below, the attachment ring 25 could likewise be formed as a separate piece from the tank 10, and fixed thereto such as with adhesive, fasteners, welding, etc. It should be noted that the attachment device could take other configurations besides a ring, such as posts, bolts, etc., fixed to the tank, surrounding or located around the opening 19, and this term is generally intended to encompass any means appropriate for connecting the cover assembly 12 to the tank 10.

The filter assembly 14 includes a diffuser tube 34 and a filter element 36. The diffuser tube 34 has an elongated, cylindrical shape, with an open receiving (upper) end 38 and an opposite open discharge (lower) end 40. The diffuser tube 34 is at least as long as the filter element, and preferably slightly more so, such that fluid passing radially outward through the filter element is constrained by and collects along the inner surface of the diffuser tube, and then runs down the tube and drains into the fluid collected below in the tank, such that the entering fluid does not create significant turbulence as it is directed into the stored fluid. The discharge (lower) end of the diffuser tube can have a perforate wall (not shown) or other means to collect items such as rags inadvertently dropped into the tank opening during element changes.

Figure 4:
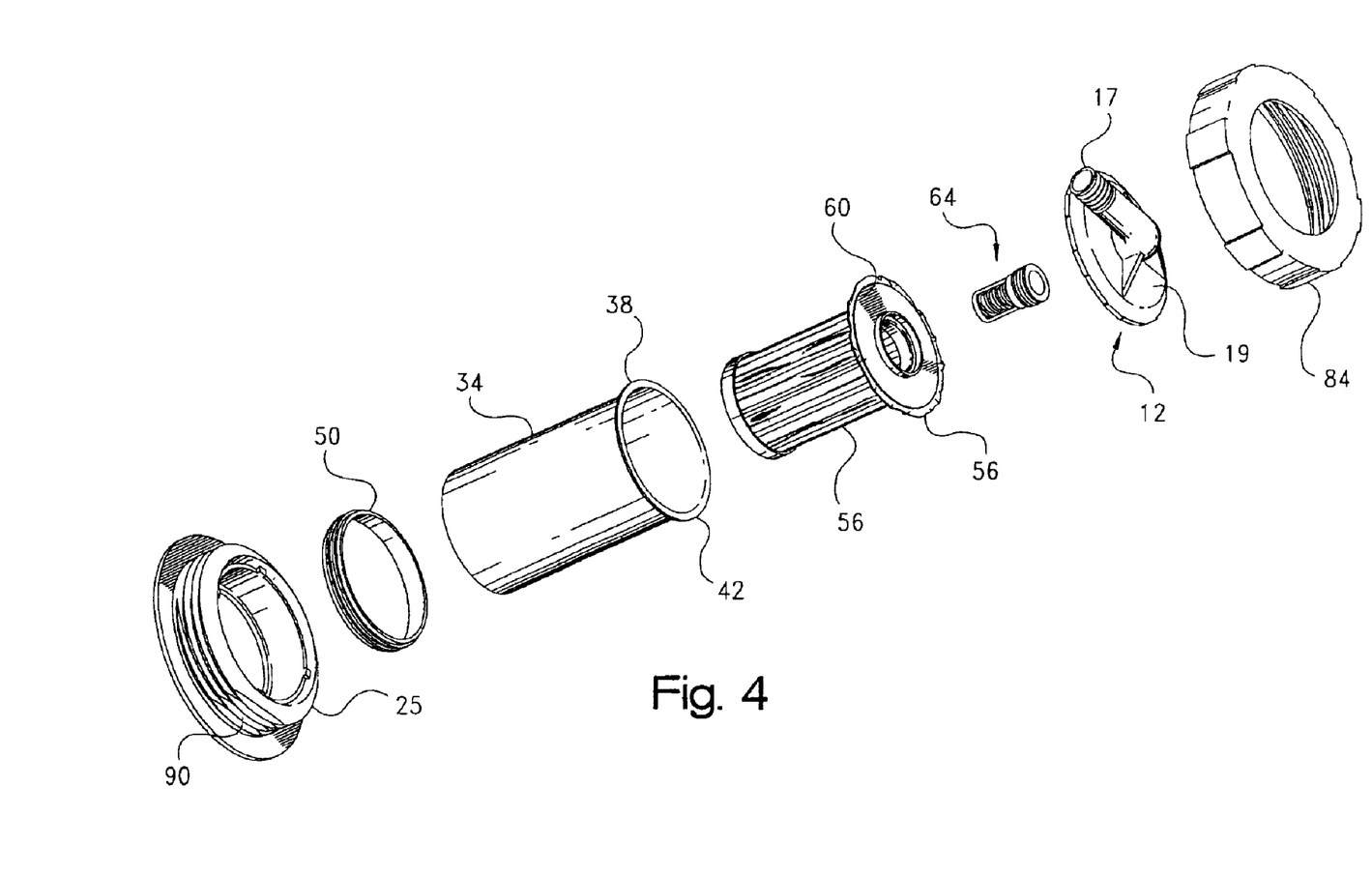
FIG. 4 is an exploded view of the filter assembly of FIG. 1.
Figure 4A:
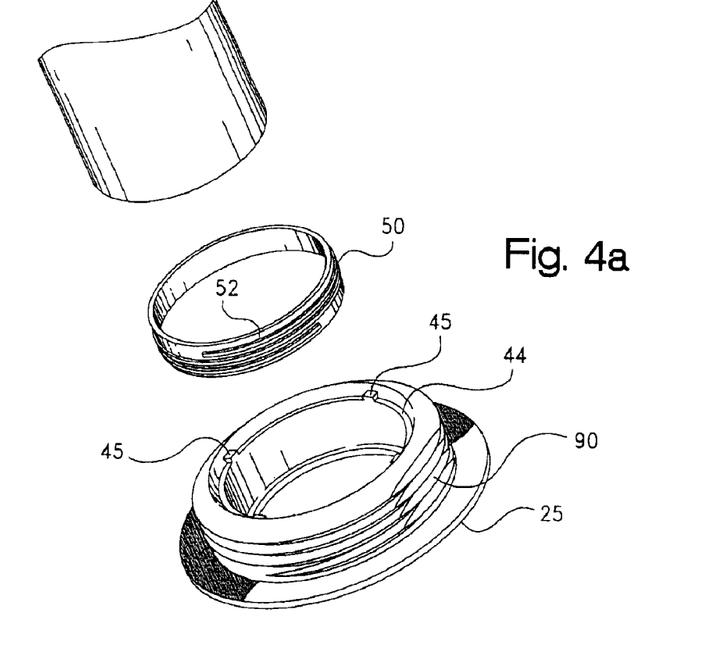
FIG. 4A is an enlarged view of certain components of the filter assembly of FIG. 4.
Figure 5:
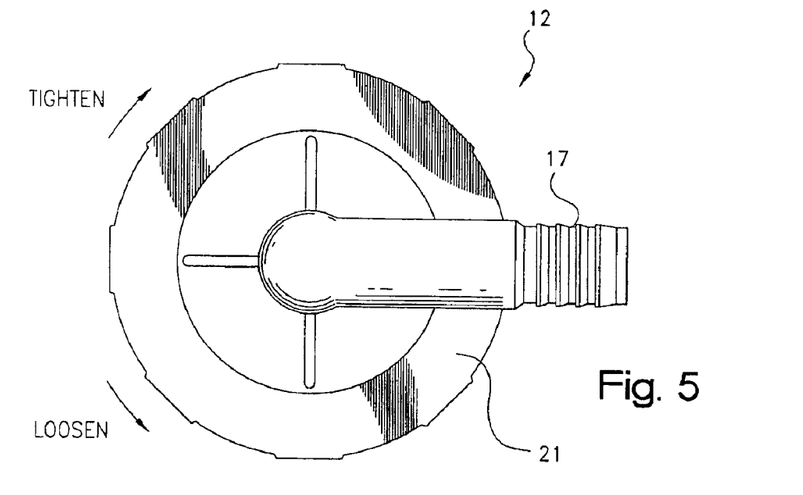
FIG. 5 is a top view of the filter assembly.

The receiving end 38 of the diffuser tube is configured to be closely received and supported within the attachment ring 25, with an annular clearance or gap 41 provided between the distal end 30 of inner sidewall 26 and the exterior surface of the diffuser tube as the inner terminus of a vent path. The receiving end 38 of the discharge tube includes a radially-outwardly projecting annular flange 42 which locates the diffuser tube within the tank opening. The flange 42 has localized bent or formed dimples or other geometry which engage and seat on an annular shoulder 44 formed between the inner sidewall 26 and the end wall 28 of the ring 25 that provide clearance between the flange and the annular shoulder for the vent path (see, e.g., FIG. 2). The clearance can likewise be created by other means. FIG. 4A, for example, shows axially-projecting tabs 45 formed in the shoulder 44 of the attachment ring to support flange 42 in spaced-apart relation from the ring.

Figure 3:
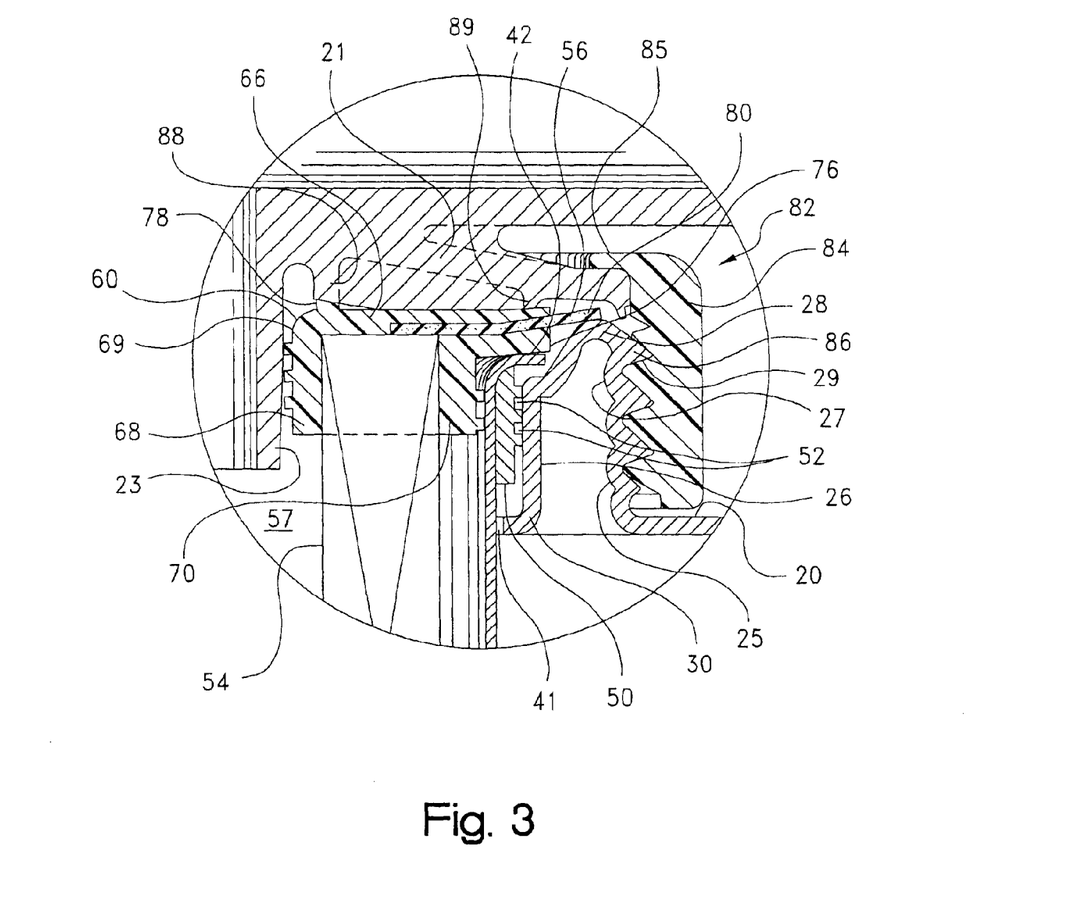
FIG. 3 is a cross-sectional side view of a portion of the filter assembly shown in FIG. 2.

A stand-off feature, preferably comprising a ring-shaped element 50, is provided in circumferentially-surrounding relation at the receiving end of the diffuser tube. Stand-off ring 50 closely surrounds the diffuser tube and is fixed thereto, such as with friction fit, adhesive or welding. As shown in FIGS. 3, 4 and 4A, the stand-off ring closely fits within the inner sidewall 26, and includes one or more exterior channels or grooves 52, to allow flow between the diffuser tube 34 and the opening 19 along the vent path. The channel(s) are preferably convoluted (e.g., spiral or helical) to collect and agglomerate oil from the vapor passing upwardly through the channel. A single spiral or helical channel is shown in FIG. 4A, however it should be appreciated that this is only one such example of an appropriate convoluted channel for the stand-off ring.

The diffuser tube is retained within the opening by a press-fit between the stand-off ring and the attachment ring, although other means (such as adhesive) could also be used. While the stand-off ring is shown as a separate piece from diffuser tube 34, it should also be appreciated that the ring could be formed unitary with the tube. It should further be appreciated that the tube 34 and/or the inner sidewall 26 or end wall 28 of the attachment ring 25 could alternatively (or in addition) have some geometry, such as tabs or ribs, which would create convoluted channels or grooves between the diffuser tube and the tank opening for the vent path.

The filter element 36 includes a ring of filtration media 54 for filtering particles and other contaminants from fluid (such as hydraulic fluid) and an integral breather ring 56. The filter media ring 54 has a cylindrical, elongated shape circumscribing a central cavity 57, and has opposite flat, annular ends. The media ring is formed of material having an efficiency and a structure (pleated, blown, etc.) appropriate for the particular application. One appropriate material for hydraulic fluid is a pleated Microglass III media, commercially-available from the Hydraulic Filter Division of Parker-Hannifin Corporation. This media is a fiberglass and steel composite; however again, this is only one example of material which can be used with the filter media ring 54, and the choice of media material will depend upon the particular application. One useful alternative is a modified Microglass III media, having a synthetic support structure, such that the element is "green", i.e., is formed only of incineratable and environmentally-friendly materials.

A first imperforate circular end cap 60 is provided at one (upper) end of the media ring, and a second imperforate circular end cap 62 is provided at the other (lower) end of the media ring. The lower end cap 62 supports a relief valve, indicated generally at 64, which allows fluid bypass of the media in the event the media becomes clogged, so that fluid can still pass from the fluid pipe 23 into the tank. The relief valve can be any relief valve appropriate for the particular application, and a preferred relief valve is shown and described in U.S. Pat. No. 4,815,493, which is owned by the assignee of the present invention and is incorporated herein by reference.

The upper end cap 60 includes an annular body portion 66 in surface-to-surface relation with the end surface of the media ring; an inner annular skirt 68 defining a central circular opening 69 for receiving pipe 23, where the inner skirt bounds the inner diameter of the media ring and extends a short distance axially along the media ring; and an outer annular skirt 70, where the outer skirt bounds the outer diameter of the media ring and also extends a short distance axially along the media ring. The inner and outer skirts 68, 70 are preferably formed in one piece (unitary) with the body portion 66, and the entire end cap 60 is preferably formed from a material which is lightweight and inexpensive, and which preferably has some flexibility, such that the inner and outer skirts resiliently deflect somewhat and can form sealing surfaces with adjacent components. Preferably the end caps are molded from a urethane, which has been found to have an appropriate balance of flexibility, longevity and cost, and facilitates attaching the breather filter, as will be explained below.

The inner skirt 68 of the upper end cap is dimensioned to closely receive the fluid pipe 23 of the cover assembly, and provide a fluid-tight seal therewith. Resilient circumferential ribs (as at 72 in FIG. 2) can be formed along the inner surface of the inner skirt to further facilitate this seal. Likewise, outer skirt 70 of the upper end cap 60 is dimensioned to closely fit within the receiving end of the diffuser tube, and provide a fluid-tight seal between the end of the media and the tube. Outer skirt 70 likewise has one or more circumferential ribs (as at 74 in FIG. 2) along the inner surface to facilitate this seal.

The upper end cap 60 further includes a radially-outward projecting annular flange 76 surrounding the end cap. Flange 76 has a dimension such that it engages and seats against the receiving end 38 of the diffuser tube 34 to axially locate the filter element in the diffuser tube. The close receipt of the end cap within the receiving end of the diffuser tube, and the locating feature provided by the flange 76, allows the filter element to be easily and properly inserted into the diffuser tube, and easily grasped and removed from the diffuser tube when the element is spent.

The upper end cap 60 further includes an annular sealing rib or flange 78, which projects axially outward (upward) a short distance from the upper end surface of the body portion 66 of the end cap. The sealing rib 78 provides a fluid-tight seal against the cover assembly 12, as will be described herein in more detail. Flange 76 and rib 78 also provide a preload against the cover assembly to hold the element securely within the diffuser tube.

Figure 2:
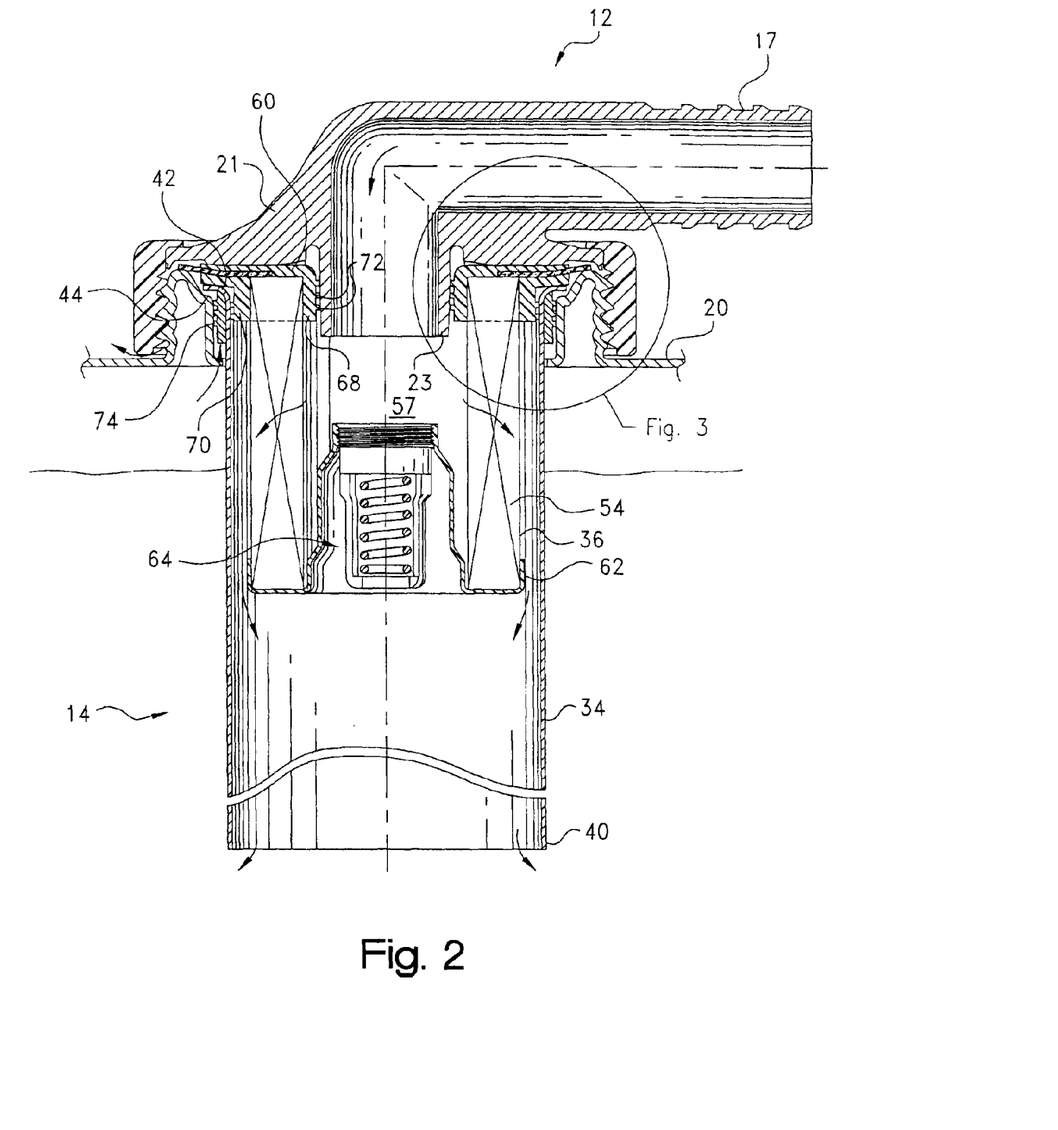
FIG. 2 is a cross-sectional side view of the filter assembly of FIG. 1.

The breather filter 56 illustrated in FIGS. 2 and 3 comprises a thin, flat, annular disk-like member sealingly bonded to one end of the filter media ring and having an annular peripheral portion 80 projecting radially-outward from the media ring, and preferably, radially outward further than the annular flange of the diffuser tube. The peripheral portion 80 of the breather filter is axially supported against the radial end wall 28 of the attachment ring. The breather ring 56 can also be formed of any material (and in any form) appropriate for the particular application, and is preferably an expanded polyurethane foam.

It is preferred that the breather filter 56 have some flexibility, particularly in the lo axial direction, and that the breather filter is preloaded against the attachment ring. The breather filter can bend upwardly away from its seat against the end wall 28 to allow vent gases above a predetermined pressure to escape from the tank. The breather filter thereby acts as a check valve to maintain a slight pressure in the tank during operation. The vent gases do not contain significant particulate, and since the oil in the vapor is collected in the convoluted channel 25, the remaining gases are substantially oil-free and can be exhausted directly to atmosphere. Some vent gasses may still pass through the breather filter for final filtration. When air is drawn into the tank, the breather filter will be pressed flat against the end wall 28 by the preload of the breather filter and the pressure differential to prevent peripheral bypass of the breather filter, and proper filtering of the incoming air.

The breather filter is also illustrated as being in surface-to-surface relation with the end of the media ring, and is preferably formed integral with the upper end cap 60. For an end cap formed from a moldable material such as urethane, the breather filter can be formed with the end cap during the molding process. In this manner, the breather filter ring 56 has an inner annular portion fixedly attached to the filter media ring 54, to prevent bypass around the inner diameter of the breather filter.

The cover assembly 12 for the filter assembly includes an attachment device, indicated generally at 82, which cooperates with the attachment device 25 of the tank to allow easy and quick attachment and removal of the cover assembly from the tank—and hence easy access to the filter element. To this end, a nut 84 having an in-turned flange 85, is received about the circumference of the circular cover body 21. The nut 84 has an inner threaded portion 86, which cooperates with the threaded portion 29 of the inner sidewall 27 to removably couple the cover assembly to the tank, so as to enclose the filter element 36. The nut 84 can be easily grasped by the user and rotated in one direction or the other to connect or disconnect the cover assembly from the tank.

The inner surface of the cover body 21 has one or more annular ribs or flanges 88, 89 projecting axially downward therefrom, and which engage the upper end surface of the upper end cap 60 to provide a fluid-tight seal therewith. Inner flange 88, in particular, engages flange 78 on the upper end cap to prevent fluid bypass of the end cap. Of course, conventional O-seals can be used in addition (or alternatively) to the ribs or flanges 76, 88 and 89, if necessary or desirable. A flow passage as at 90 in FIGS. 4 and 4A is provided between the threads of nut 84 and the threads of ring 25 to fluidly connect the vent path through stand-off ring 50 with atmosphere. The flow passage could likewise be formed between the nut 84 and the cover body 19, or through any other appropriate location in the filter assembly (of course, fluidly separate from the fluid path through the filter element) to provide a vent path between atmosphere and tank.

As should be apparent, the upper end cap 60 of the filter element fluidly separates a first hydraulic fluid flow path internally of the element, that is, from fluid pipe 23, into the central cavity 57 of the media ring, radially outward through the media ring, and then down between the exterior surface of the media ring and the diffuser tube 34 for collection in the tank below—from a second, vent flow path externally of the diffuser tube between the diffuser tube and the tank opening 19. Fluid entering the filter element from the inlet port 17 is filtered before collecting in the tank, and is then drawn out through the outlet port 18 (FIG. 1) as necessary. During operation of the fluid system, as pressures and vacuums are created in the tank, the gasses (typically with oil vapor) in the tank can exhaust to atmosphere through the vent path and the breather filter, with the channel(s) 52 in stand-off ring 50 collecting oil contaminants, causing the oil particles to agglomerate and drain back down into the tank. The oil-free gases then pass through or around the breather filter, before being exhausted to atmosphere. Air can enter the tank by passing directly through the breather filter, with any particulate and contaminants being removed before reaching the stored hydraulic fluid.

Since the breather is an integral component of the filter assembly, the number of separate stock keeping units necessary for repair and maintenance of the filter in the hydraulic system is reduced. In addition, since the, breather ring is replaced at the same time as the hydraulic fluid filter, it is ensured that the vent and filter for the vent gasses and ambient air is being properly maintained. Combining the breather filter and the hydraulic fluid filter as a single unit, and locating the filter assembly (at least partially) within the tank also conserves space on the chassis or frame for the hydraulic system.

Figure 6:
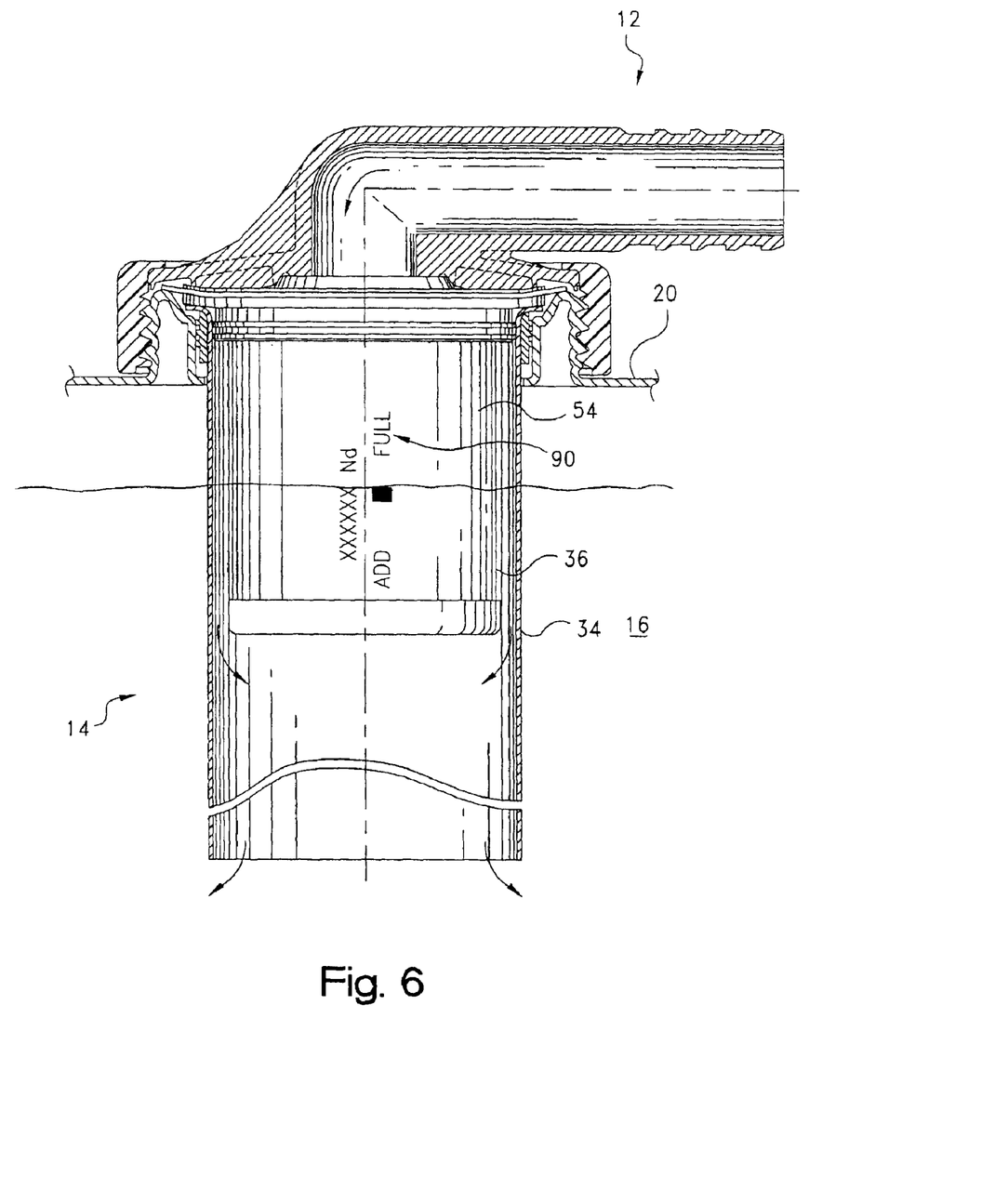
FIG. 6 is a cross-sectional side view of a portion of the filter assembly, shown rotated ninety-degrees from the view in FIG. 3.

In many applications, the filter element 36 is long enough such that it is at least partially covered by oil collected in the tank during system operation at least when there is a sufficient volume of oil in the tank. As shown in FIG. 6, appropriate indicia 90, such as bands, alpha-numeric representations, etc., can be provided along the side of the filter media ring 54 to enable the user to visually inspect the level of fuel 16 in the tank when the filter element is removed (and to thereby add more fluid to the system if necessary). The indicia can be located as appropriate along the media ring, and is preferably located along a side seam seal, such as described in U.S. Pat. No. 5,762,796, which is also owned by the assignee of the present invention and incorporated herein by reference.

Figure 7:
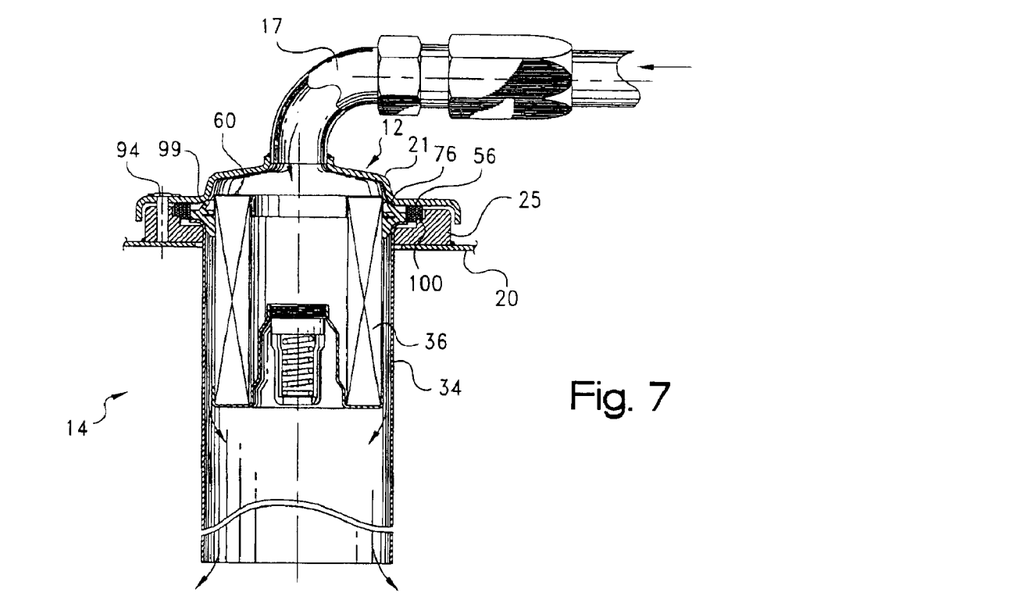
FIG. 7 is a cross-sectional side view of a filter assembly constructed according to a further embodiment of the present invention.
Figure 8:
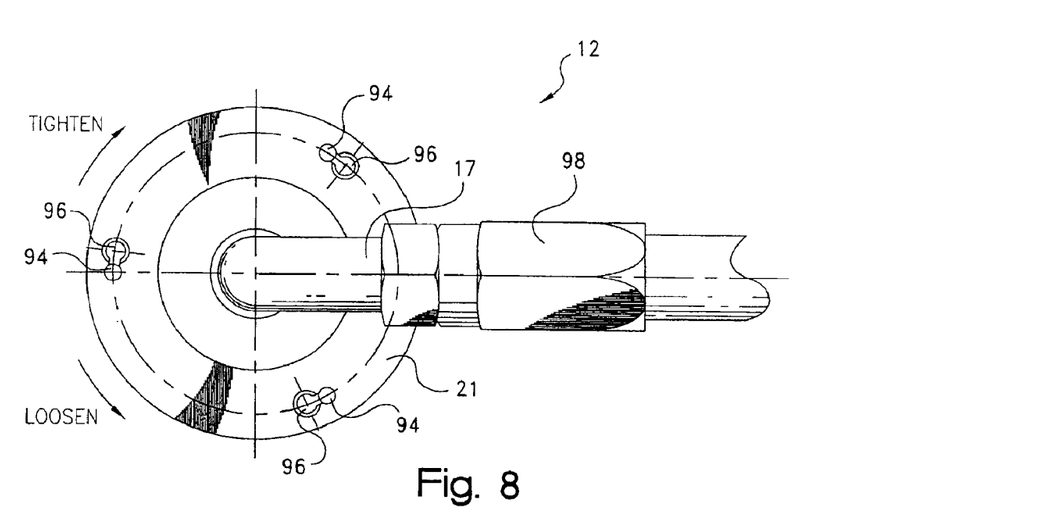
FIG. 8 is a top view of the filter assembly of FIG. 7.

An alternative embodiment of the breather filter and cover assembly for the filter assembly is shown in FIGS. 7 and 8. In this embodiment, the tank attachment ring 25 is illustrated as being a separate piece from the tank wall 20. The cover assembly 12 is also illustrated as being connected to the attachment ring 25 using a series of posts 94 received in openings 96 in the cover body 21, rather than the threaded attachment described previously. The receiving end of the diffuser tube 34 in this embodiment includes a series of unitary tabs or set-offs (not shown) around the circumference thereof, which provide a clearance gap when the diffuser tube is seated in the attachment ring. A standard crimped fitting 98 is also illustrated around inlet port 17 instead of the barbs, as described previously.

Also in this embodiment, the breather filter 56 is illustrated as having an annular configuration closely surrounding the outer, side surface of the upper end cap 60, rather than being attached to the upper end surface of the end cap/media ring. In this embodiment, an annular elastomeric seal 99 is shown between the breather filter and the upper end cap 60, to provide a fluid-tight seal between the filter element 36, the diffuser tube 34, and the cover body 21, such that the flow path for fluid received from inlet port 17 is fluidly separated from the vent path between the diffuser tube and the tank opening. The breather ring can be fixed, such as with adhesive or extruded with the seal 99, and the seal is retained on the peripheral flange 76 on the upper end cap. In contrast to the first embodiment, the breather filter 56 in the second embodiment does not have significant flexibility, and is seated on and supported by an annular internal shoulder 100 of the tank attachment ring 25.

The stand-off ring with convoluted channel(s) is absent in this second embodiment, and the breather filter acts both as an agglomerator of oil and a final filter for vent gasses passing outwardly from the tank—and a filter for air passing into the tank. Again, such a breather filter can be formed from a wide range of materials. All other aspects of this embodiment are the same or substantially the same as in the first embodiment described above, and will not be described further for sake of brevity.

In the embodiments described above, the breather filter is shown projecting radially outward from the end of the filter element, or surrounding the element. It should be appreciated that the breather filter could also project axially outward from one end of the filter element, or generally have other configurations other than those described above, and still provide the same function.

As described above, the patent invention thereby provides a hydraulic system which prevents the escape of unfiltered vent gasses from a storage tank, and which has fewer separate components to reduce the stock-keeping units necessary for proper maintenance, and reduce the installation, repair and maintenance costs and efforts necessary for maintaining the system in safe and reliable operation.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
    a filter media ring for separating particulate and contaminants from hydraulic fluid passing through the media ring, and an integral annular breather filter disposed about the periphery of the filter media ring and projecting radially outward therefrom, the breather filter fixed to one end of the media ring for separating particulate and contaminants from vent gas and ambient air passing through the breather filter.

2. The filter element as in claim 1, wherein an imperforate end cap is sealingly bonded to each end of the filter media ring, and the annular breather filter is attached to one of the end caps at one end of the media ring with at least a portion in outwardly surrounding relation to the one end cap, the one end cap fluidly separating a first fluid flow path through the filter media ring from a second vent flow path through or around the breather filter.

3. The filter element as in claim 2, wherein the one end cap includes a central opening for receiving a fluid pipe, and seal means for providing a fluid-tight seal with a cover assembly.

4. The filter element as in claim 3, wherein the breather filter comprises an annular, ring-shaped filter member sealing bonded along a radially-inner surface to the filter media ring and outwardly surrounding the one end of the media ring.

5. A filter assembly comprising the filter element of claim 1, and an elongated cylindrical diffuser tube receiving and supporting the filter element, the diffuser tube including a receiving end with a radially outward-projecting flange configured to enable the filter element to be axially located and supported in the diffuser tube.

6. A filter element, comprising:
    a filter media ring for separating particulate and contaminants from hydraulic fluid passing through the media ring, and an integral annular breather filter fixed to one end of the media ring for separating particulate and contaminants from vent gas and ambient air passing through the breather filter, wherein the breather filter comprises a thin, flat, annular filter member sealingly bonded to one end of the filter media ring and having a peripheral portion projecting radially-outward from the media ring.

7. The filter element as in claim 6, wherein the breather filter is flexible.

8. A filter assembly comprising a filter element and a diffuser tube receiving and supporting the filter element, the filter element comprising:
    a filter media ring for separating particulate and contaminants from hydraulic fluid passing through the media ring, and an integral annular breather filter fixed to one end of the media ring for separating particulate and contaminants from vent gas and ambient air passing through the breather filter, the diffuser tube including a receiving end locating and supporting the filter element in the diffuser tube, wherein the diffuser tube includes a stand-off feature at its receiving end defining a vent path along the exterior surface of the diffuser tube.

9. The filter assembly as in claim 8, wherein the stand-off feature comprises a stand-off ring outwardly surrounding the diffuser tube, the stand-off ring including a channel or groove defining a convoluted vent path along the exterior surface of the diffuser tube.

10. A filter assembly comprising a filter element and a diffuser tube receiving and supporting the filter element, the filter element comprising:
    a filter media ring for separating particulate and contaminants from hydraulic fluid passing through the media ring, and an integral annular breather filter fixed to one end of the media ring for separating particulate and contaminants from vent gas and ambient air passing through the breather filter, and an elongated cylindrical diffuser tube receiving and supporting the filter element, the diffuser tube including a receiving end with a radially outward-projecting flange configured to enable the filter element to be axially located and supported in the diffuser tube, wherein an imperforate end cap is sealingly bonded to each end of the filter media ring, and the annular breather filter is attached to one of the end caps at one end of the media ring, the one end cap fluidly separating a first fluid path through the filter media ring from a second vent path through or around the breather filter, and the flange on the diffuser tube axially supporting the one end cap.

11. The filter assembly as in claim 10, wherein the breather filter has a greater radial peripheral dimension than the flange on the diffuser tube.

12. A fluid system, comprising:
    a fluid storage tank including an opening and attachment means around the tank opening; a filter assembly including a filter element removeably located in the tank opening; and a cover assembly having an inlet port for directing fluid into the tank, the cover assembly also including attachment means cooperating with the attachment means of the tank to support and retain the filter assembly in the tank opening, the filter element including a filter media ring and an annular breather filter surrounding the filter media ring, a fluid flow path provided from the inlet port, through the filter media ring to tank; and a vent path provided between the tank and atmosphere through the breather filter.

13. The fluid system as in claim 12, wherein the filter assembly further includes a diffuser tube outwardly surrounding and supporting the filter element, and the vent path is provided between the diffuser tube and the attachment means of the cover assembly and the tank.

14. The fluid system as in claim 13, wherein the diffuser tube includes a receiving end with a radially outward-projecting flange bounding the periphery of the receiving end and configured to enable the filter element to be axially located and supported in the diffuser tube.

15. The fluid system as in claim 14, wherein the diffuser tube includes a stand-off feature at its receiving end defining a convoluted vent path along the exterior surface of the diffuser tube to allow the tank to vent through the breather filter to atmosphere, wherein the convoluted vent path causes oil in vent gasses to agglomerate as the vent gasses pass through the vent path.

16. The fluid system as in claim 15, wherein the stand-off feature comprises a stand-off ring outwardly surrounding the diffuser tube, the stand-off ring including a helical channel or groove along the exterior surface thereof.

17. The fluid system as in claim 13, wherein an imperforate end cap is sealingly bonded to each end of the filter media ring, and the annular breather filter is attached to one of the end caps at one end of the media ring, the one end cap fluidly separating a first fluid flow path through the filter media ring from a second vent path through or around the breather filter.

18. The fluid system as in claim 17, wherein the one end cap includes a central opening for closely and sealingly receiving a fluid pipe of the cover assembly, and seal means for providing a fluid-tight seal with the cover assembly.

19. The fluid system as in claim 18, wherein the breather filter comprises a thin, flat, flexible annular filter member with an inner portion sealingly bonded to the one end of the filter media ring and having a peripheral portion projecting radially-outward from the media ring.

20. The fluid system as in claim 18, wherein the breather filter comprises an annular, ring-shaped filter member sealing bonded along a radially-inner surface to the filter media ring and outwardly surrounding the one end of the media ring.

21. The fluid system as in claim 12, wherein the tank includes an outwardly-projecting attachment ring bounding the opening and configured to closely receive the filter assembly, and the attachment ring includes outwardly-directed threads, and the cover assembly includes an integral collar with threads which cooperate with the threads on the attachment ring to enable the filter assembly to be supported in and removed from the tank.

22. The fluid system as in claim 21, wherein the breather filter comprises a thin, flat, annular shaped filter member fixed to the one end of the media ring and projecting radially-outward from the media ring, the annular breather filter being supported around its peripheral edge by the attachment ring.

23. The fluid system as in claim 22, wherein the breather filter is flexible.

24. The fluid system as in claim 23, wherein the breather filter is preloaded against the attachment ring.

25. The fluid system as in claim 21, wherein the breather filter comprises an annular, ring-shaped filter member fixed in outwardly surrounding relation to one end of the media ring, the ring-shaped breather filter being supported within an inner annular shoulder of the attachment ring.

* * * * *